(12) United States Patent
Takeshima

(10) Patent No.: US 7,780,943 B2
(45) Date of Patent: Aug. 24, 2010

(54) PRODUCTION METHOD AND APPARATUS FOR COMPOUND OXIDE POWDER

(75) Inventor: Shinichi Takeshima, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 329 days.

(21) Appl. No.: 11/542,206

(22) Filed: Oct. 4, 2006

(65) Prior Publication Data

US 2007/0031313 A1 Feb. 8, 2007

Related U.S. Application Data

(63) Continuation of application No. PCT/JP2005/008468, filed on Apr. 27, 2005.

(30) Foreign Application Priority Data

May 6, 2004 (JP) .............................. 2004-137574

(51) Int. Cl.
  *C01F 17/00* (2006.01)
  *C01B 13/14* (2006.01)
(52) U.S. Cl. ............... 423/593.1; 423/263; 423/594.12; 502/302
(58) Field of Classification Search ...... 423/593.1–601, 423/263; 502/302–304, 340, 349–350
See application file for complete search history.

(56) References Cited

U.S. PATENT DOCUMENTS

| 5,087,437 A | 2/1992 | Bruno et al. |
| 5,242,674 A * | 9/1993 | Bruno et al. .............. 252/519.1 |
| 5,670,088 A * | 9/1997 | Chittofrati et al. ............. 516/22 |
| 6,083,467 A | 7/2000 | Takeshima et al. |
| 2004/0171483 A1 | 9/2004 | Takeshima |
| 2004/0234439 A1* | 11/2004 | Takeshima et al. .......... 423/263 |

FOREIGN PATENT DOCUMENTS

JP A 1-286923 11/1989

(Continued)

OTHER PUBLICATIONS

Masui, Toshiyuki, et al. "Characterization and Catalytic Properties of $CeO_2$-$ZrO_2$ Ultrafine Particles Prepared by the Microemulsion Method." *Journal of Alloys and Compounds*, vol. 269, pp. 116-122, (1998).

Primary Examiner—Scott Kastler
Assistant Examiner—Brian Walck
(74) Attorney, Agent, or Firm—Oliff & Berridge, PLC

(57) ABSTRACT

A compound oxide powder producing method for producing compound oxide powder made of at least two kinds of metals. A solution, in which a first metal compound for producing, when hydrolyzed, a hydroxide or oxide is dissolved in an organic solvent, and an emulsion, which contains another metal in the form of ions in an aqueous phase inside of inverse micelles formed by a surfactant in an organic solvent, are individually mixed in flowing states. The mixed liquid is stirred while being continuously caused to flow to the downstream side of a mixing portion of the first solution and the emulsion. Primary particles are formed by the hydrolysis of the first metal compound inside or in the interface of the inverse micelles whereas secondary particles are formed by the agglomeration of the primary particles.

1 Claim, 3 Drawing Sheets

FOREIGN PATENT DOCUMENTS

| | | |
|---|---|---|
| JP | A 02-175602 | 7/1990 |
| JP | A 05-004817 | 1/1993 |
| JP | A 07-246343 | 9/1995 |
| JP | A 10-216517 | 8/1998 |
| JP | A 11-267502 | 10/1999 |
| JP | A 2004-262702 | 9/2004 |
| JP | A 2004-345890 | 12/2004 |
| JP | A 2004-345920 | 12/2004 |

* cited by examiner

PRODUCTION METHOD AND APPARATUS FOR COMPOUND OXIDE POWDER

TECHNICAL FIELD

This invention relates to a method for producing compound oxide powder to be employed as a catalyst for purifying the exhaust gas of an internal combustion engine, and an apparatus for carrying out the method.

BACKGROUND ART

As the method for producing the compound oxide powder, there are generally known the simultaneous powder sintering method, the co-precipitation method and the alkoxide method. In the simultaneous powder sintering method, the powder of a precursor such as an oxide, a carbonate or a hydroxide of each metal is mixed and sintered. In the co-precipitation method, a colloidal dispersion liquid of an oxide or hydroxide is produced by adding alkali to an aqueous solution of a plurality of inorganic metallic salts thereby to neutralize it. In the alkoxide method, a plurality of metallic alkoxides dissolved in an organic solvent are hydrolyzed by adding water to them.

The simultaneous powder sintering method is limited in the fineness of the powder, and a sintering operation at a high temperature is needed for obtaining a compound oxide from the powder. In the hot sintering operation, the granules grow, and their surface area drops. As a matter of fact, it is difficult to obtain the fine powder of the compound oxide which has a high surface area and which is completely homogenized at the atomic level.

The co-precipitation method utilizes the neutral sedimentation reactions of inorganic ions in an aqueous solution. Although the colloidal particles to be produced have fine diameters, the sedimentation reactions of the inorganic ions depend on the pH. Therefore, the individual colloidal particles have a tendency that they become individual particles of metal oxides or metal hydroxides, but do not produce the compound oxides which are not homogeneously mixed at the atomic level.

The existing alkoxide method utilizes the hydrolyses of a plurality of metallic alkoxides in the organic solvent. However, the stability and the hydrolytic rate are different according to the kind of the metallic alkoxide. Therefore, the priority for producing the oxides is between the metals, and the method has also failed to produce the compound oxides which is homogeneously mixed at the atomic level.

In JP-A-10-216517 or JP-A-7-246343, on the other hand, there is disclosed a method, in which catalytic active particles (i.e., compound oxide particles such as precious metal particles or ceria-zirconia particles) are synthesized, and in which oxide carriers are then simultaneously synthesized around the catalytic active particles in that reaction field.

However, the aforementioned invention, as described in JP-A-10-216517 or JP-A-7-246343, is intended to suppress the sintering by the particle migrations of the catalytic active particles thereby to suppress the thermal deterioration of the catalyst, but not to improve the dispersion of the metal ions constituting the compound oxides.

DISCLOSURE OF THE INVENTION

This invention has been conceived noting the aforementioned technical problem and has an object to provide a method capable of improving, even in case much compound oxide powder is produced all at once, the dispersion of metal ions thereby to homogenize the particle diameter and composition, and an apparatus for practicing the method.

In order to achieve the above-specified object, according to the invention, there is provided a compound oxide powder producing method for producing compound oxide powder made of at least two kinds of metals. The method is characterized in that a solution, in which a first metal compound for producing, when hydrolyzed, a hydroxide or oxide is dissolved in an organic solvent, and an emulsion, which contains another metal in the form of ions in an aqueous phase inside of the inverse micelles formed by an surfactant in an organic solvent, are individually mixed in flowing states, in that the mixed liquid is stirred while being continuously caused to flow to the downstream side of a mixing portion of the first solution and the emulsion, and in that primary particles are formed by the hydrolysis of said first metal compound inside or in the interface of said inverse micelles whereas secondary particles are formed by the agglomeration of the primary particles.

In addition to the above-specified constitution, the method is characterized in that a coalescence promoting operation for promoting the coalescences of the inverse micelles in said mixed liquid is performed in a stirred state on the downstream of said mixing portion. The coalescence promoting operation can be exemplified by the pH adjustment of said mixed liquid.

According to the invention, on the other hand, there is provided a compound oxide powder producing apparatus for producing compound oxide powder made of at least two kinds of metals. The apparatus is characterized by comprising: a mixing portion for mixing a solution, in which a first metal compound for producing, when hydrolyzed, a hydroxide or oxide is dissolved in an organic solvent, and an emulsion, which contains another metal in the form of ions in an aqueous phase inside of the inverse micelles formed by an surfactant in an organic solvent, individually in flowing states; and a fluidly stirring portion disposed downstream of said mixing portion for stirring the mixed fluid while continuously flowing the same.

In addition to the above-specified constitution, the apparatus is characterized by comprising an adding portion disposed in said fluidly stirring portion for promoting the coalescences of the inverse micelles in said mixing liquid. The coalescence promoting agent may be a pH adjusting agent.

According to this invention, therefore, the solution, in which the first metal compound for producing, when hydrolyzed, the hydroxide or oxide is dissolved in the organic solvent, and the emulsion, in which inverse micelles containing other metal ion are dispersed in an internal aqueous phase, are individually mixed in flowing states. The mixture liquid of the preceding solution and the emulsion has already flown from that mixing portion, so that a new solution and an emulsion are mixed to keep the mixing conditions such as the concentration or the pH homogeneous. Moreover, the mixture liquid having flown down from that mixing portion is stirred while flowing. Meanwhile, the hydrolyses in the interface of the inverse micelles proceed, and the particles of hydroxides or oxides, as produced by the hydrolyses, agglomerate and grow. In the flowing/stirring process, a solution or emulsion is neither. newly added nor brought into contact with a new solution or emulsion, so that the environment or atmosphere such as the concentration or the pH is kept constant. As a result, the environment or atmosphere such as the concentration or the pH in the course of the mixing between the solution and the emulsion and the subsequent stirring process becomes constant, and the reaction is ended at the instant of the flow of a predetermined distance so that the reaction time can be homogenized. As a result, it is possible to produce the compound oxide powder of a homogenous particle diameter or composition.

According to this invention, on the other hand, the pH of the mixture liquid being stirred while flowing is adjusted to promote the coalescence of the inverse micelles. Therefore, it is possible to stabilize the growth of the primary particles of the hydroxides due to the hydrolyses of metallic alkoxides and the secondary particles by the agglomeration of the primary particles. It is further possible to stabilize the porous structure or pore volume by the agglomeration of the secondary particles.

BEST MODE FOR CARRYING OUT THE INVENTION

Figure 1:
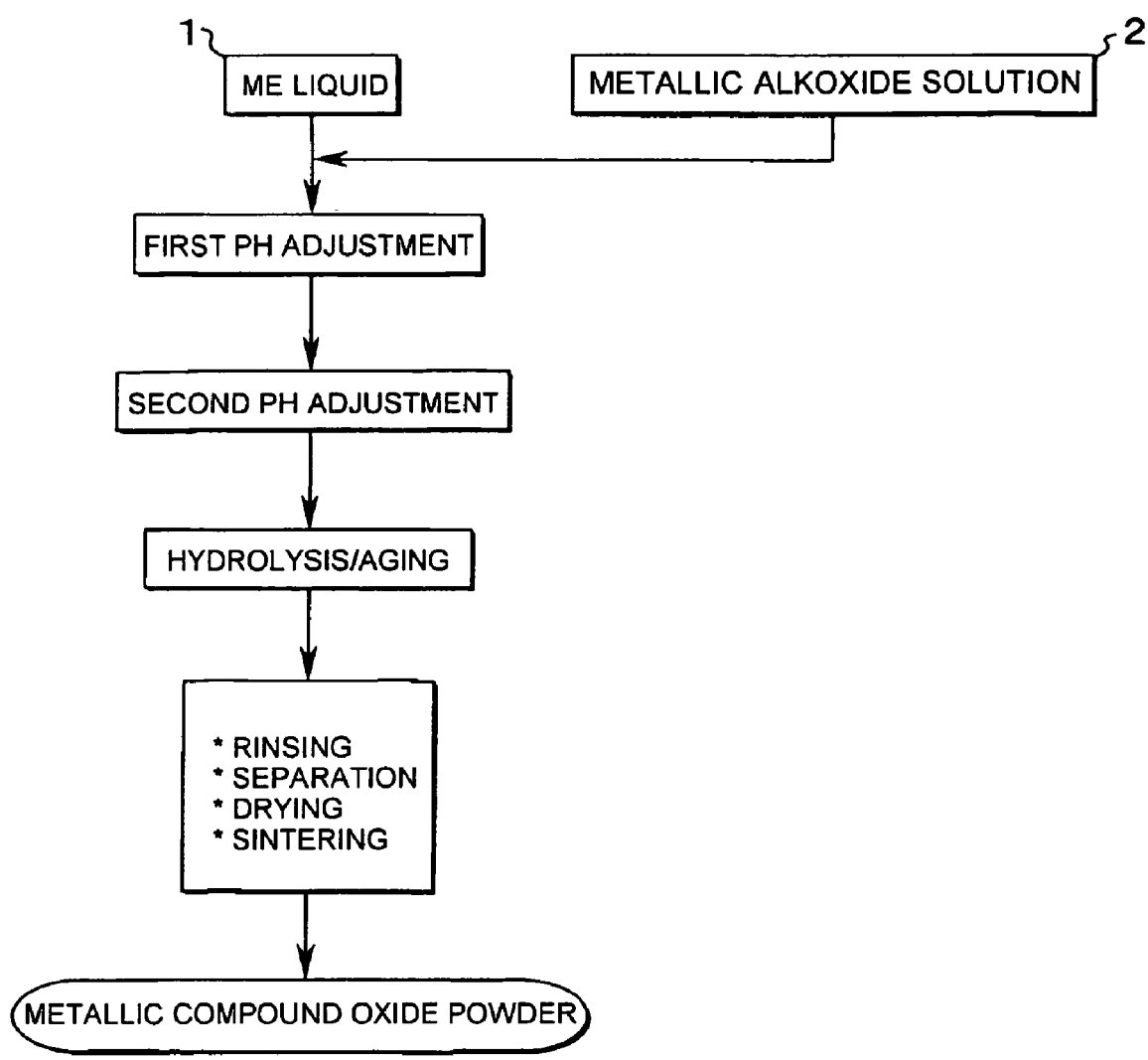
FIG. 1 is a flow chart for explaining one example of a method of this invention.

One example of a producing method of this invention is shown as a flow chart in FIG. 1. The fundamental principle of this invention resides in that an emulsion (as will be called the "ME liquid") 1, in which inverse micelles having an aqueous phase containing metal ions are dispersed in an organic solvent, and a solution 2, in which a metal compound for producing hydroxides by hydrolyses is dissolved in an organic solvent, are mixed in a mutually fluid state. This system of compound oxides of metals is well known in most texts and handbooks, and most oxides of many metal elements for forming metal oxides such as alumina, zirconia, ceria, silica, iron oxides, manganese oxides, chromium oxides or yttrium oxides can form compound oxides by adding the second and subsequent metal elements. It is known what elements are combined to form the compound oxides. This invention can be applied to all of the compound oxides so long as hydrolytic materials or inorganic metallic salts are present.

In this invention, the metal to make the metallic compound is not a metal in a narrow meaning but generally an element M capable of forming the M-O-M bonds. Moreover, the compound oxide powder, as obtained by this invention, can be used in various applications. For example, the compound oxide powder can be used as an exhaust gas purifying catalyst, although it does not limit this invention in the least. The useful example is a compound oxide of cerium and zirconium, a compound oxide of lanthanum and zirconium, lanthanum stabilized alumina, barium-stabilized alumina, a compound oxide of lanthanum, strontium and zirconium.

The aforementioned solution 2 is described. There is known a metallic compound for producing, when hydrolyzed, a hydroxide or oxide, either of which can be employed in this invention. There can be enumerated metallic alkoxide or acetylacetone metal complex. The metal compound may produce, when hydrolyzed, a metal hydroxide or metal oxide.

The metallic element M to make metallic alkoxide includes elements of the first group to the fourteenth group, sulfur, selenium and tellurium of the sixteenth group, and phosphorous, arsenic, antimony and bismuth of the fifteenth group. Here, it is said that the platinum-group elements or some lanthanide elements do not make the alkoxides. For example, the silicon alkoxide or the germanium alkoxide is called the metallic alkoxide. The metallic alkoxide is easily available, because various alkoxides are sold on the market and because their producing method is well known in the art. The hydrolyses of metallic alkoxides $M(OR)_n$ (wherein: M designates a metal; and R designates an alkyl radical such as methyl, ethyl, propyl or butyl) are also known, and are formally expressed by:

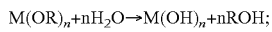

$$M(OR)_n + nH_2O \rightarrow M(OH)_n + nROH;$$

and then

$$M(OH)_n \rightarrow MO_{n/2} + n/2 H_2O.$$

The hydrolyses of acetylacetone complex $(CH_3COCH_2COCH_3)_nM$ (wherein M designates a metal) are also known, and is expressed by:

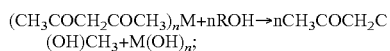

$$(CH_3COCH_2COCH_3)_nM + nROH \rightarrow nCH_3COCH_2C(OH)CH_3 + M(OH)_n;$$

and then

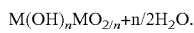

$$M(OH)_n \rightarrow MO_{2/n} + n/2 H_2O.$$

The acetylacetone complex is easily available, because various metal complexes are sold on the market and because their producing method is well known in the art. The acetylacetone metal complex is represented by aluminum acetonate, barium acetonate, lanthanum acetonate, platinum acetonate or the like, and has more kinds than those of alkoxides.

The organic metallic compound such as the metallic alkoxide or the acetonate metallic compound is relatively easily dissolved by selecting a proper solvent from a polar organic solvent or a non-polar organic solvent.

The organic solvent to dissolve the aforementioned metal compound is exemplified by hydrocarbons such as cyclohexane or benzene, straight-chain alcohol such as hexanol, ketone such as acetone, and so on. The standards for selecting the organic solvent include not only the solution of the surfactant but also the area for forming microemulsion (i.e., the magnitude of the molar ratio of water to surfactant is large).

Here is described the aforementioned ME liquid 1. In this invention, it is preferred that the reaction system is the water in oil droplet (w/o) type emulsion system or the microemulsion system. In this case, it is thought at first that the method can attain a high hydrolyzing rate firstly due to an extremely small diameter of several nm to several tens nm of the microemulsions and a remarkably large area (about 8,000 m²/litter in the case of the diameter of 10 nm) of the interface between the oil phase—the aqueous phase, and a homogenization effect secondly due to the fact that the aqueous phase is finely dispersed so that metallic ions of an extremely small number (about 100 ions) are contained each inverse micelle.

In this sense, it is preferred that the diameter of the aqueous phase of the microemulsion micelles is 2 to 40 nm, preferably 2 to 15 nm and more preferably 2 to 10 nm.

The method for producing the emulsion group or the microemulsion group of the water in oil droplet type is known. As the organic solvent medium, there can be employed hydrocarbons such as cyclohexane or benzene, straight-chain alcohol such as hexanol, ketone such as acetone, or the like similar to the aforementioned organic solvents. The surfactant to be used in this invention extends over various kinds such as a nonionic-group surfactant, an anion-group surfactant or a cation-group surfactant, and can be employed in combination with the organic phase (or oil phase) components conforming to the applications.

As the surfactant of the nonionic group, there can be used a polyoxyethylene nonylphenyl ether group represented by polyoxyethylene (n=5) nonylphenyl ether, a polyoxyethylene octylphenyl ether group represented by polyoxyethylene (n=10) octylphenyl ether, a polyoxyethylene alkylether group surfactant represented by polyoxyethylene (n=7) cetyl ether, and a polyoxyethylene sorbitari group surfactant represented by polyoxyethylene sorbitan trioleate.

The anion-group surfactant can be exemplified by di-2-ethylene hexylsulfur sodium succinate, and the cation-group surfactant can be exemplified by cetyl trimethyl ammonium chloride or cetyl trimethyl ammonium bromide.

The production method of this invention is preferable to be performed in the water in oil droplet type emulsion system or the microemulsion system.

In the aqueous phase (i.e.,. in the inverse micelle dispersed by the surfactant) of the aforementioned ME liquid 1, a metal different from that dissolved in the aforementioned solution 2 is made to exist as ions. This metal can be exemplified by cerium (Ce), lanthanum (La), aluminum (Al) or strontium (Sr). It is possible to use their water-soluble metallic salts, especially, inorganic salts such as nitrates or chlorides, or organic salts such as acetate, lactate or oxalate. The ions of the second element existing in the aqueous solution may be not only single ions of metals but also complex ions containing the second element. Moreover, the third or subsequent metallic ions may exist in the aqueous phase.

The aforementioned ME liquid 1 and solution 2 are mixed, and are subjected to a first pH adjustment and stirred, the hydrolyses of the metal compounds occur in the interface of the inverse micelles. Specifically, particles of metal hydroxides are produced by using the inside of the inverse micelles as the reaction field, and the particles (or primary particles) agglomerate to form secondary particles. In this invention, the metallic hydroxide particles by the hydrolyses of such metallic compounds are produced by mixing the ME liquid 1 and the aforementioned solution 2 in the individual fluid states and by stirring them.

Figure 2:
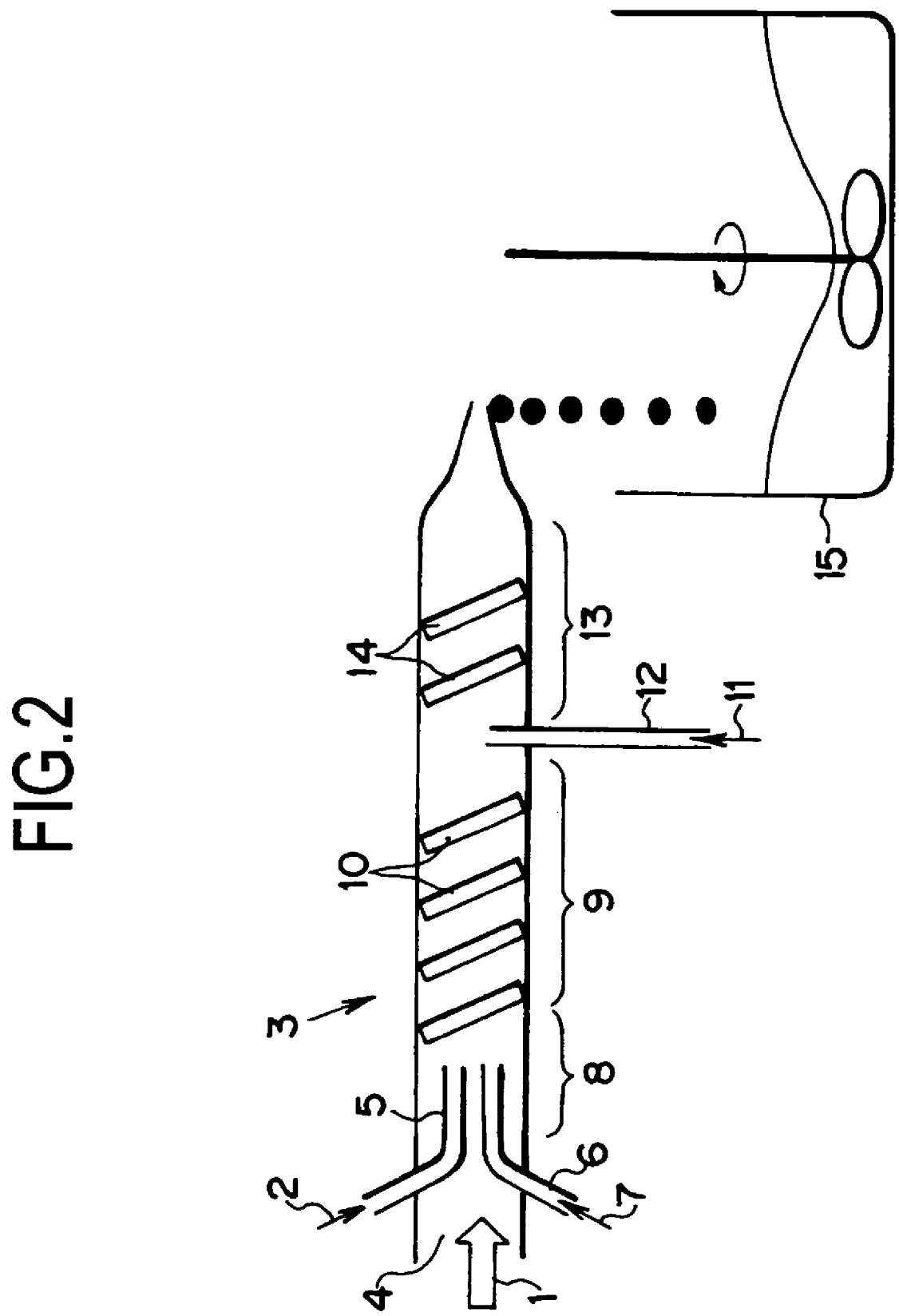
FIG. 2 is a schematic diagram showing one example of an apparatus according to this invention on principle.

FIG. 2 shows one example of an apparatus therefor schematically. The ME liquid 1 is continuously fed from an inlet 4 of a cylindrical reaction container 3, and the aforementioned solution 2 is also continuously fed from a first feed pipe 5, which is opened near the inlet 4. In addition, a firs pH-adjusting liquid 7 is fed from a second feed pipe 6. Here, the first pH-adjusting liquid 7 can be exemplified by ammonia water (NH$_4$OH). As a result, a mixing zone 8 is formed near the portion, in which those feed pipes 5 and 6 are opened.

The portion downstream of that mixing zone 8 is a first stirring zone 9. In this stirring zone 9, the mixed liquid of the ME liquid 1 and the solution 2 is stirred while being fed in one direction. The stirring zone 9 is constituted, for example, such that baffles 10 for establishing turbulent flows are arranged in the reaction container 3. The hydrolyses of metal compounds occur for a short time (e.g., about 1 minute) so that the first stirring zone 9 is set to a length sufficient for the hydrolyses according to the flow speed of the mixed liquid.

In the method of this invention, the production of the primary particles by the hydrolyses in the inverse micelles and the production of the secondary particles by the subsequent agglomerations of the primary particles are continued for a predetermined time period, and then the agglomeration and aging of the secondary particles are performed, while being accompanied by the coalescences of the inverse micelles. Specifically, a second pH-adjustment is performed to lower the surface potentials of the inverse micelles to zero, and the stirring operations are continued. This corresponds to the "hydrolysis/aging" step of FIG. 1.

In the apparatus shown in FIG. 2, moreover, a third feed pile 12 for adding a second pH-adjusting liquid 11 is opened on the downstream side of the first stirring zone 9. Hence, this third feed pipe 12 corresponds to an addition unit of the invention. The second pH-adjusting liquid 11 promotes the coalescences of the inverse micelles, in which the particles of metallic hydroxides occur, thereby to agglomerate the secondary particles with one another. In short, the adjustment is made to set the surface potential of the inverse micelles to zero. Specifically, it is possible to employ ammonia water. Downstream of the portion where the third feed pipe 12 is opened, there is formed a second stirring zone 13. This second stirring zone 13, as shown in FIG. 2, is provided mainly for mixing the second pH-adjusting liquid 11 and the mixed liquid as homogeneously as possible. In the second stirring zone 13, as in the aforementioned first stirring zone 9, there are arranged baffles 14 for establishing turbulences 14. The second stirring zone 13 is shorter than the first stirring zone 9.

The apparatus, shown in FIG. 2, is provided with an aging bath 15 for reserving and slowly stirring a mixture liquid having flown out of the reaction container 3, so that the secondary particles may be aged. In this aging bath 15, the mixture liquid is kept at the room temperature or the like and is continuously stirred for a predetermined time period. Here, the stirring rate is set so slow as to agglomerate the secondary particles. Moreover, the time period for the stirring operations is exemplified by about 60 minutes. After the aging of the predetermined period, the sediments of the agglomerated secondary particles gradually are formed. These sediments are filtered out and are subjected to rinsing, separating, drying and sintering treatments sequentially in the recited order so that the compound oxide powder is obtained. Here, those treatments from the rinsing to sintering operations may be those known in the prior art.

According to the method and apparatus of this invention, therefore, the production of the primary particles by the hydrolyses of the metal compounds and the production of the secondary particles by the agglomerations of the primary particles are performed by mixing the ME liquid 1 and the solution 2 having the metal compound dissolved in the organic solvent while they are flowing, so that the reaction conditions such as the concentration or the pH are homogenized. As a result, the particle diameters or compositions of the primary particles and the secondary particles are homogenized. Even if the quantities of the ME liquid and the solution 2 are large, the mixing zone 8 and the downstream first stirring zone 9 are continuously fed with the ME liquid 1 and the solution 2 so that their individual quantities do not become especially large at the mixing time. Even if, therefore, the quantities of the ME liquid 1 and the solution 2 are large, it is possible to produce the compound oxide powder which is homogeneous in the diameters or compositions of the particles.

Here are presented Examples and Comparison, which were performed for confirming the effects of this invention.

EXAMPLE 1

The water in oil droplet (w/o) type microemulsion (having a measured water droplet diameter of 7.2 nm) was prepared by mixing 1,850 parts of cyclohexane and 350 parts of polyethylene (N=5) nonylphenyl ether, by adding an aqueous solution of 0.13 mols of cerium nitrate and 150 parts of distilled water to that mixture, and by stirring them at the room temperature by means of a magnetic stirrer. Moreover, a zirconium alkoxide solution having 0.13 mols of zirconium butoxide dissolved in 200 parts of cyclohexane was prepared as a solution of such a metal compound in an organic solvent as produces a hydroxide when hydrolyzed.

While the aforementioned ME liquid being made to flow (at a flow speed of 0.15 m/s) in one direction, a solution having the aforementioned metal compound dissolved therein was fed at a predetermined rate (of 15 ml/s) to that ME liquid so that the two liquids were continuously mixed. Simultaneously with this, ammonia water was added to adjust the pH value to 8 or less. This mixed liquid was fed, while being stirred in a turbulent state, to a beaker as the aging bath, and ammonia water was added midway as a second pH adjusting liquid thereby to adjust the pH to "8". The mixed liquid thus subjected to the second pH adjustment was stirred for about 60 minutes in the beaker by the magnetic stirrer. The sediments obtained by filtering the mother liquor were rinsed three times with ethanol, dried at 80° C. for one night, sintered in the air from the temperature rise to 300° C., and further sintered in the air at 600° C. for 2 hours, thereby to produce compound oxide (ceria zirconia) containing cerium and zirconium. The compound oxide had a Ce/Zr molar ratio of 1/1.

The aforementioned method was executed for the aimed trial quantities of 1 kg, 10 kg and 20 kg, and the mesopore volumes (i.e., the mesopore volumes of pore diameters of about 2 nm to 100 nm) of the compound oxide powder obtained were measured by the liquid nitrogen adsorption method known in the prior art. The results are tabulated in Table 1.

(Comparison)

The aforementioned ME liquid was prepared in a predetermined container such as a beaker, and the aforementioned zirconium alkoxide solution was added while being stirred. Then, the container inside instantly turned whitish yellow (with a particle diameter of about 10 nm), to produce colloidal particles. The pH was adjusted to "8" with ammonia water so as to adjust the agglomeration of the colloids. Moreover, the aging was performed by continuing the stirring operation for about 1 hour. The sediments obtained by filtering the mother liquid were rinsed, dried and sintered like aforementioned (Example 1).

The aforementioned so-called "batch method" was executed for the aimed trial quantities of 40 g, 1 kg, 10 kg and 20 kg, and the mesopore volumes of the compound oxide powder obtained were measured by the liquid nitrogen adsorption method known in the prior art. The results are tabulated in Table 1.

TABLE 1

| Aimed Trial Quantities | Mesopore Volume cc/g | |
|---|---|---|
| | Comparison | Example 1 |
| 40 g | 0.232 | — |
| 1 kg | 0.204 | 0.230 |
| 10 kg | 0.175 | 0.234 |
| 20 kg | 0.165 | 0.232 |

As tabulated in Table 1, it is seen from Comparison, in which the mixing and stirring operations between the ME liquid and the metallic alkoxide solution were performed in the fixed container, that the mesopore volume became the less as the production was the more, so that the particle diameter was not stable. It has been clarified that the mesopore volume was substantially fixed independently of the yield according to the method of this invention so that the compound oxide powder obtained had the uniform particle size.

Figure 3:
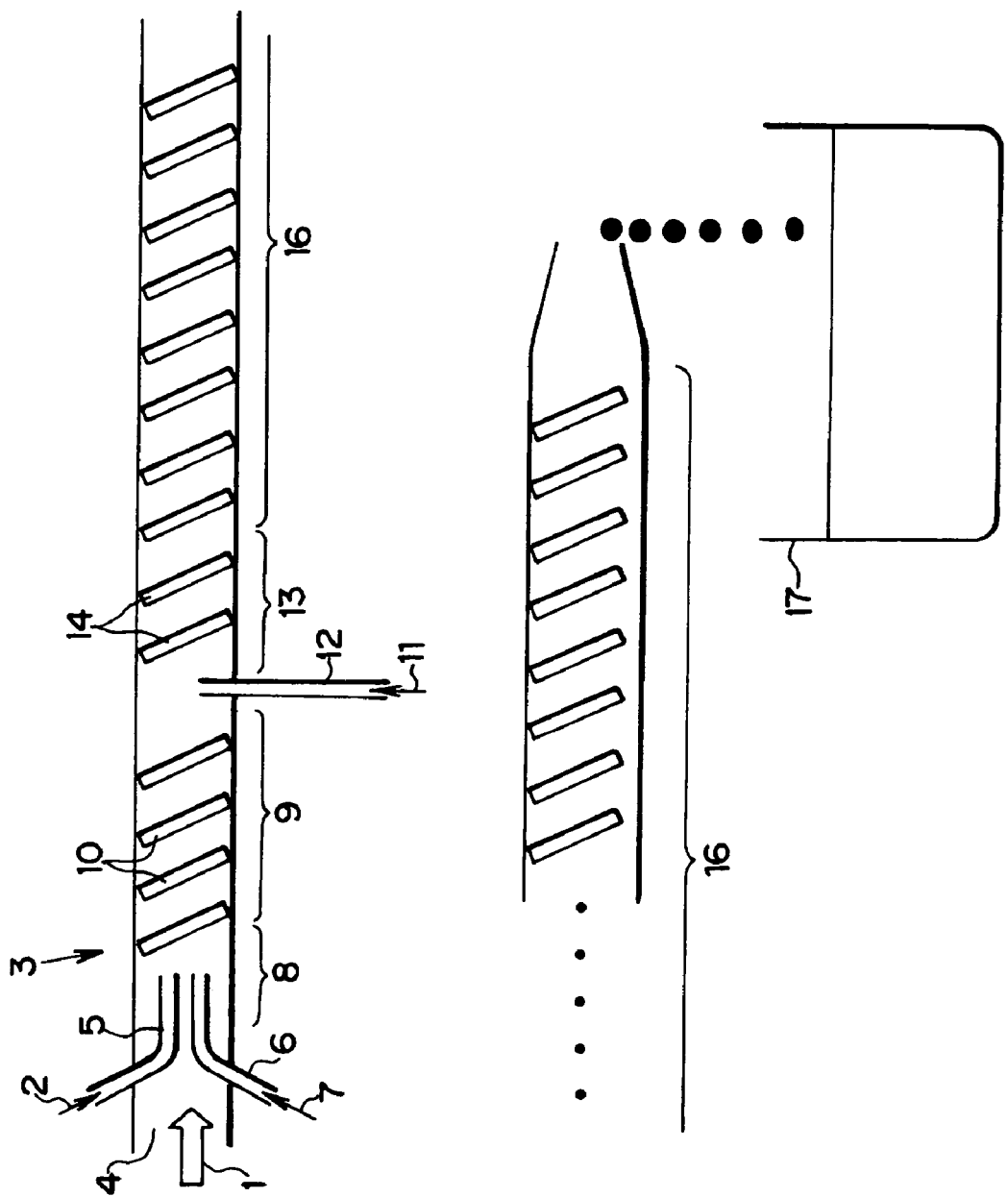
FIG. 3 is a schematic diagram showing another example of the apparatus according to this invention on principle.

Here, this invention should not be limited to the aforementioned specific example, but may also be modified such that the agglomeration of the secondary particles may be done not in the aging bath but in a fluid state. This example is schematically shown in FIG. 3. In this shown example of the apparatus, a third stirring zone 16 of a similar constitution is formed on the downstream side of the aforementioned second stirring zone 13 shown in FIG. 2. The third stirring zone 16 is set to have such a length of fluid time (e.g., about 60 minutes) that the secondary particles may agglomerate each other to a predetermined diameter by adding the second pH adjusting liquid 11. Here, numeral 17 designates a reserving bath for receiving the mixed liquid to come out from the third stirring zone 16.

An example for confirming the method of this invention for agglomerating the secondary particles with each other in the fluid state is described in the following in comparison with the foregoing Example 1.

EXAMPLE 2

The ME liquid and the zirconium alkoxide solution, as described in Example 1, were used, and the hydrolysis of zirconium and alkoxide and the agglomeration of the hydroxide particles were performed in the fluid state throughout the whole process. Here, the rinsing, drying and sintering operations of the sediments obtained were performed as in the foregoing Example 1.

The mesopore volume in the compound oxide obtained and the synthesis per 1.5 hours were measured. The results are tabulated in Table 2.

Moreover, the mesopore volume and the synthesis per 1.5 hours of the compound oxides by the foregoing Example 1 were measured and are shown together in Table 2. In Table 2, the column "Flow Throughout" indicates the measured result of Example 2, and the column "Flow Only Initially" indicates the measured result of Example 1.

TABLE 2

| Pore Container of Compound Oxide cc/g | | Quantitiy of One Trial of Compound Oxide (about 1.5 h) Kg | |
|---|---|---|---|
| Flow Only Initially 500 L Container | Flow Throughout | Flow Only Initially 500 L Container | Flow Throughout |
| 0.232 | 0.242 | 7 | 60 |

As tabulated in Table 2, the mesopore volume was substantially common between Example 1 and Example 2, and had no significant difference. This is because the productions of the primary particles for the compound oxides and the secondary particles or the agglomerations of the primary particles were substantially completed in the mixing zone 8 and the first stirring zone 9 and because the difference in the process was not in the individual embodiments. On the contrary, the synthesis of Example 2 rose by about 8 times from that of Example 1. This is because the mixing and stirring operations between the ME liquid and the metallic alkoxide solution are stopped during the aging in the aging bath in the method of Example 1. On the contrary, all procedures from the mixing to the aging occurred simultaneously to have little useless running state in Example 2.

Here, this invention should not be limited to the specific examples thus far described, but the structures of the mixing zone and the individual stirring zones can be so suitably modified as to effect their fundamental functions.

INDUSTRIAL APPLICABILITY

This invention can be utilized in the fields of industry for producing catalysts or their fine material powder.

The invention claimed is:

1. A compound oxide powder producing method for producing compound oxide powder made of at least two kinds of metals, comprising:

mixing a first solution, in which a first metal compound for producing, when hydrolyzed, a hydroxide or oxide is dissolved in an organic solvent, and an emulsion, which contains another metal in the form of ions in an aqueous phase inside of inverse micelles formed by a surfactant in an organic solvent, to form a mixed liquid, by continuously flowing the first solution and the emulsion while performing pH-adjustment, wherein the pH-adjustment is performed on the mixed liquid;

stirring the mixed liquid at a downstream side of a mixing portion of the first solution and the emulsion while flowing the mixed liquid; and thereafter carrying out a coalescence promoting step for promoting the coalescences of the inverse micelles in the mixed liquid at the downstream side of the mixing portion while stirring the mixed liquid by adding a pH adjusting agent to the flowing mixed liquid to adjust the surface potential of the inverse micelles to zero; wherein primary particles are formed by the hydrolysis of the first metal compound caused by the pH-adjustment inside or in the interface of the inverse micelles whereas secondary particles are formed by an agglomeration of the primary particles.

* * * * *